(12) United States Patent
Knoll et al.

(10) Patent No.: US 7,634,398 B2
(45) Date of Patent: Dec. 15, 2009

(54) METHOD AND APPARATUS FOR REATTACHING NODES IN A PARSE STRUCTURE

(75) Inventors: Sonja S. Knoll, Redmond, WA (US); David N. Weise, Kirkland, WA (US); David Parkinson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1147 days.

(21) Appl. No.: 10/150,127

(22) Filed: May 16, 2002

(65) Prior Publication Data

US 2003/0216904 A1    Nov. 20, 2003

(51) Int. Cl.
    G06F 17/27    (2006.01)
(52) U.S. Cl. .............................. 704/9; 704/1
(58) Field of Classification Search ...... 704/1, 704/9, 10
    See application file for complete search history.

(56) References Cited

U.S. PATENT DOCUMENTS

| | | | | |
|---|---|---|---|---|
| 5,146,406 | A | * | 9/1992 | Jensen ........................ 704/9 |
| 5,418,717 | A | * | 5/1995 | Su et al. ..................... 704/9 |
| 5,878,386 | A | * | 3/1999 | Coughlin .................... 704/10 |
| 5,966,686 | A | * | 10/1999 | Heidorn et al. ............. 704/9 |
| 6,138,098 | A | * | 10/2000 | Shieber et al. ............. 704/257 |
| 6,223,150 | B1 | * | 4/2001 | Duan et al. ................. 704/9 |
| 6,243,669 | B1 | * | 6/2001 | Horiguchi et al. .......... 704/9 |
| 6,243,670 | B1 | * | 6/2001 | Bessho et al. .............. 704/9 |
| 6,275,791 | B1 | * | 8/2001 | Weise ......................... 704/9 |
| 2002/0040292 | A1 | * | 4/2002 | Marcu ......................... 704/4 |

OTHER PUBLICATIONS

Stevenson, S. "A Competition-based Explanation of Syntactic Attachment Preferences and Garden Path Phenomena." Association for Computational Linguistics, 1993, pp. 266-273.*
Sturt et al. "Monotonic Syntactic Processing: A Cross-Linguistic Study of Attachment and Reanalysis." Language and Cognitive Processes, 11, 1996, pp. 449-494.*
Stevenson. "Parsing as Incremental Restructuring". In: J. Fodor & F. Ferreira, Reanalysis in Sentence Processing. Dordrecht: Kluwer, 1998, pp. 327-362.*
Ferrari-Bridgers, "Limits of on-line strategies of reanalysis," Systems, Man, and Cybernetics, 2001 IEEE International Conference on , 2001, pp. 187-192.*
Stahl, H. et al., "An Efficient Top-Down Parsing Algorithm for Understanding Speech by Using Stochastic Syntactic and Semantic Models," 1996 IEEE International Conference on Acoustics, Speech, and Signal Processing Conference Proceedings (Cat. No. 96CH35903), Part vol. 1, pp. 397-400 (1996).

(Continued)

Primary Examiner—James S Wozniak
(74) Attorney, Agent, or Firm—Theodore M. Magee; Westman, Champlin & Kelly, P.A.

(57) ABSTRACT

A method is provided for forming a reconstructed parse structure for an initial parse structure. Under the method, at least one rule used to form the initial parse structure and at least one additional rule are executed to form the reconstructed parse structure. In many embodiments, the reconstructed parse structure differs from the initial parse structure in that a node is located in a different position in the reconstructed parse structure than in the initial parse structure.

26 Claims, 13 Drawing Sheets

OTHER PUBLICATIONS

His-Jian Lee et al., "Parsing Coordinate Constructions in Mandarin Chinese," Computer Processing of Chinese & Oriental Languages, vol. 8, No. 1, pp. 19-35 (1994).

Ali, S.S., "A Propositional Semantic Network with Structured Variables for Natural Language Processing," Proceedings of the 6th Australian Joint Conference on Artificial Intelligence, pp. 365-370 (Nov. 16-19, 1993).

Shaban, M., "Using Shared-Packed Forests in a GB Parser," Proceedings Sixth International Conference on Tools with Artificial Intelligence, pp. 246-252 (Nov. 6-9, 1994).

His-Jian Lee et al., "Parsing Chinese Nominalizations Based on HPSG," Computer Processing of Chinese & Oriental Languages, vol. 6, No. 2, pp. 143-158 (Dec. 1992).

Jensen, K., "A Broad-Coverage Natural Language Analysis System," International Workshop on Parsing Technologies, pp. 425-441 (1989).

Flickinger, D. et al., "Structure-Sharing in Lexical Representation," 23rd Annual Meeting of the Association for Computational Linguistics, Morristown, NJ, USA, pp. 262-267 (1985).

Karttunen, L. et al., "Structure Sharing with Binary Trees," 23rd Annual Meeting of the Association for Computational Linguistics pp. 133-164 (1985).

Uehara, K. et al., "Improvement on the Performance of Predicate Logic Oriented Parsing Program on a Virtual Machine," Transactions of the Information Processing Society of Japan, vol. 25, No. 4, pp. 587-596 (1984).

* cited by examiner

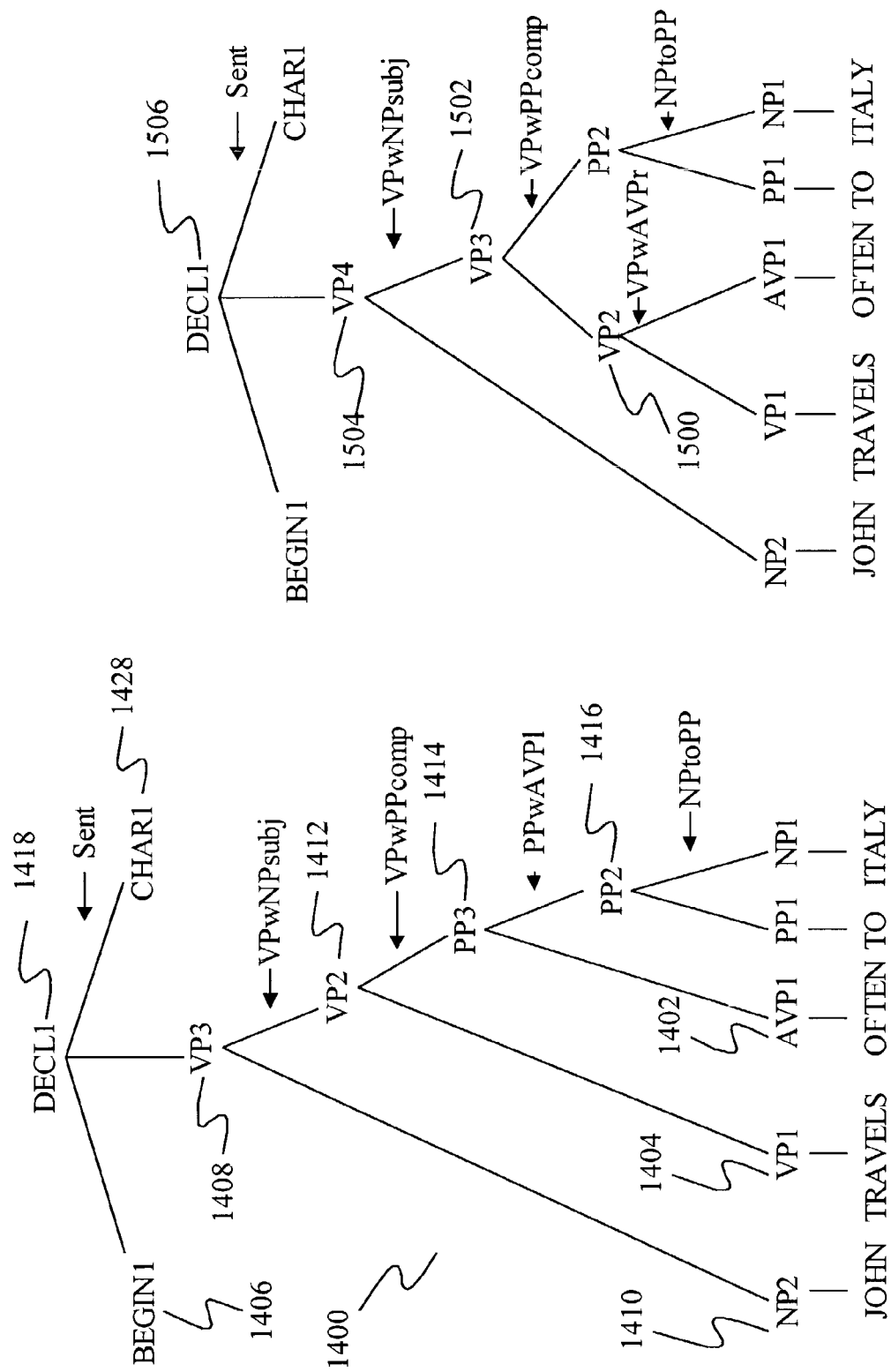

METHOD AND APPARATUS FOR REATTACHING NODES IN A PARSE STRUCTURE

BACKGROUND OF THE INVENTION

The present invention relates to natural language processing. In particular, the present invention relates to syntactic parsing of text.

A natural language parser is a program that takes a text segment, usually a sentence, of natural language (i.e., human language, such as English) and produces a data structure, usually referred to as a parse tree. This parse tree typically represents the syntactic relationships between the words in the input segment.

In general, natural language parsers build the parse trees by applying syntax rules to the input text segment. Parsers apply these rules in either a "top-down" or a "bottom-up" manner.

In a bottom-up parser, all of the possible parts of speech for the individual words of the input text are first identified to form a set of word tokens. The parser then attempts to combine the individual word tokens into larger syntactic structures, such as noun phrases and verb phrases, by applying syntax rules to the tokens. The resulting larger structures represent candidate nodes for the parse tree. The parser continues to try to build larger and larger structures by applying syntactic rules to previously identified candidate nodes. A full parse is achieved when a node spans the entire text segment.

During the construction of the nodes, attribute-value pairs that describe the structure represented by the node are created. For example, a first token attribute and a last token attribute are associated with each node to indicate the first token and the last token that the node spans. Additionally, attributes such as "head", which indicate the primary element of a noun phrase or a verb phrase, and "psmods", which indicates the modifiers found after the head can be included for a node. The number and type of attributes that are associated with a node is unlimited and is controlled by the rule used to form the node.

The computational complexity of forming the parse is a function of the number of candidate nodes that are formed. To limit the number of candidate nodes, some systems adopt a minimal attachment strategy that prevents certain candidate nodes from being formed if other candidate nodes have already been formed or are expected to be formed.

Although this minimal attachment strategy reduces the complexity of forming an initial parse structure, it can result in parse trees that are less than optimal. To address this, many parsing systems walk through the initial parse tree to determine if it can be changed to provide a better parse.

One technique for improving a parse is to move a node in the parse tree to a different location within the tree. In the past, such reattachment was performed by executing a set of rules and functions to change the attribute-value pairs of the nodes affected by the reattachment so that the attribute-value pairs reflected the new location for the moved attribute-value pairs, they are different from the rules and functions used to form the initial parse tree. As a result, when attribute-value pairs are added or altered by a parse rule or when the use of attribute-value pairs changes, the rules and functions used to reattach nodes must be modified separately. This can create errors in the parser system as a whole and increases the cost of improving the parser.

As such, a reattachment method is needed that does not require separate rules for reattachment.

SUMMARY OF THE INVENTION

A method is provided for forming a reconstructed parse structure for an initial parse structure. Under the method, at least one rule used to form the initial parse structure and at least one additional rule are executed to form the reconstructed parse structure. In many embodiments, the reconstructed parse structure differs from the initial parse structure in that a node is located in a different position in the reconstructed parse structure than in the initial parse structure.

BRIEF DESCRIPTION OF THE DRAWINGS

FIG. 14 is an example of an initial parse tree in which a reattach node is not positioned below the target node.

FIG. 15 is an example of a reconstructed parse tree formed from the initial parse tree of FIG. 14.

DETAILED DESCRIPTION OF ILLUSTRATIVE EMBODIMENTS

Figure 1:
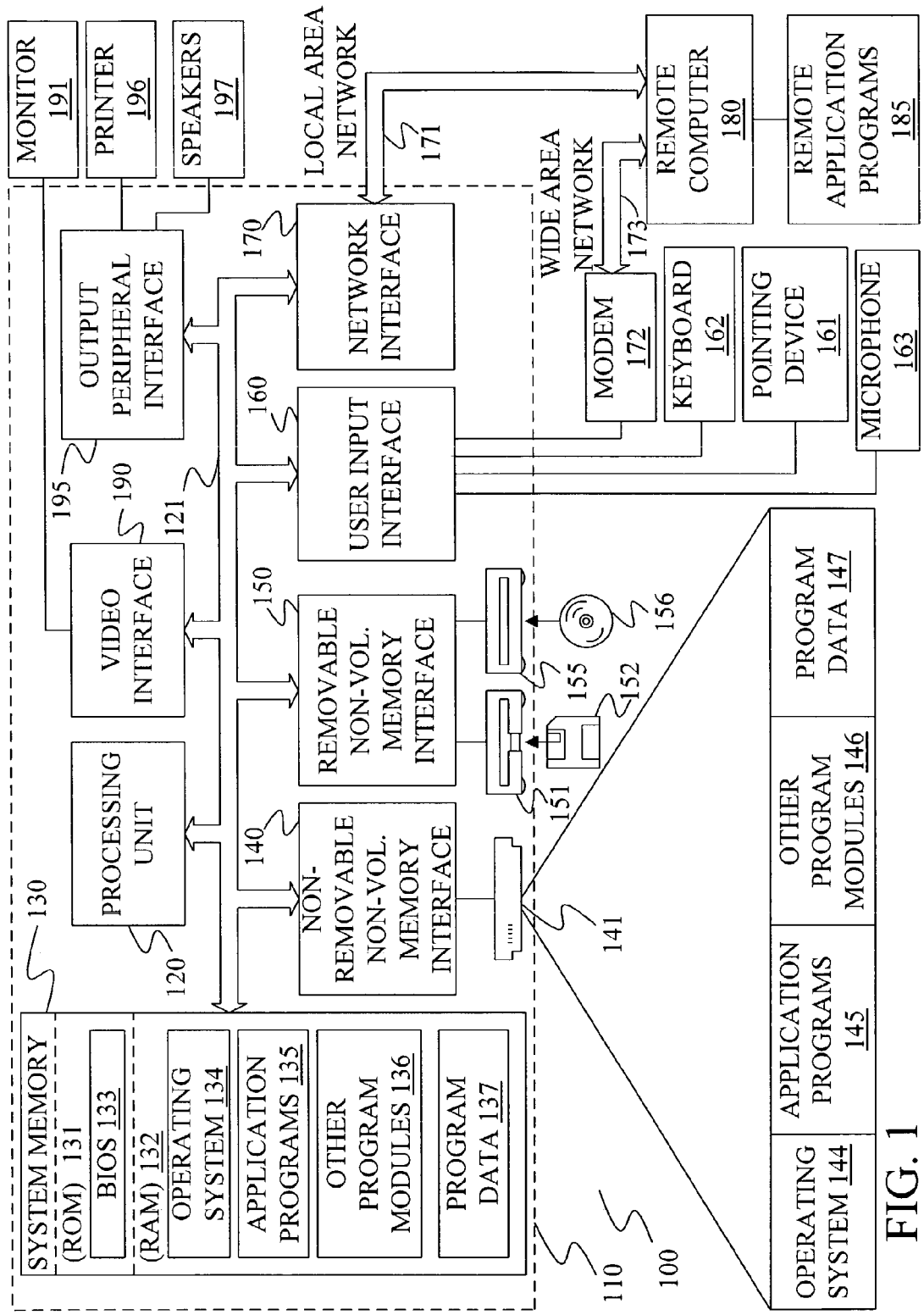
FIG. 1 is a block diagram of a general computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 100.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, FR, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
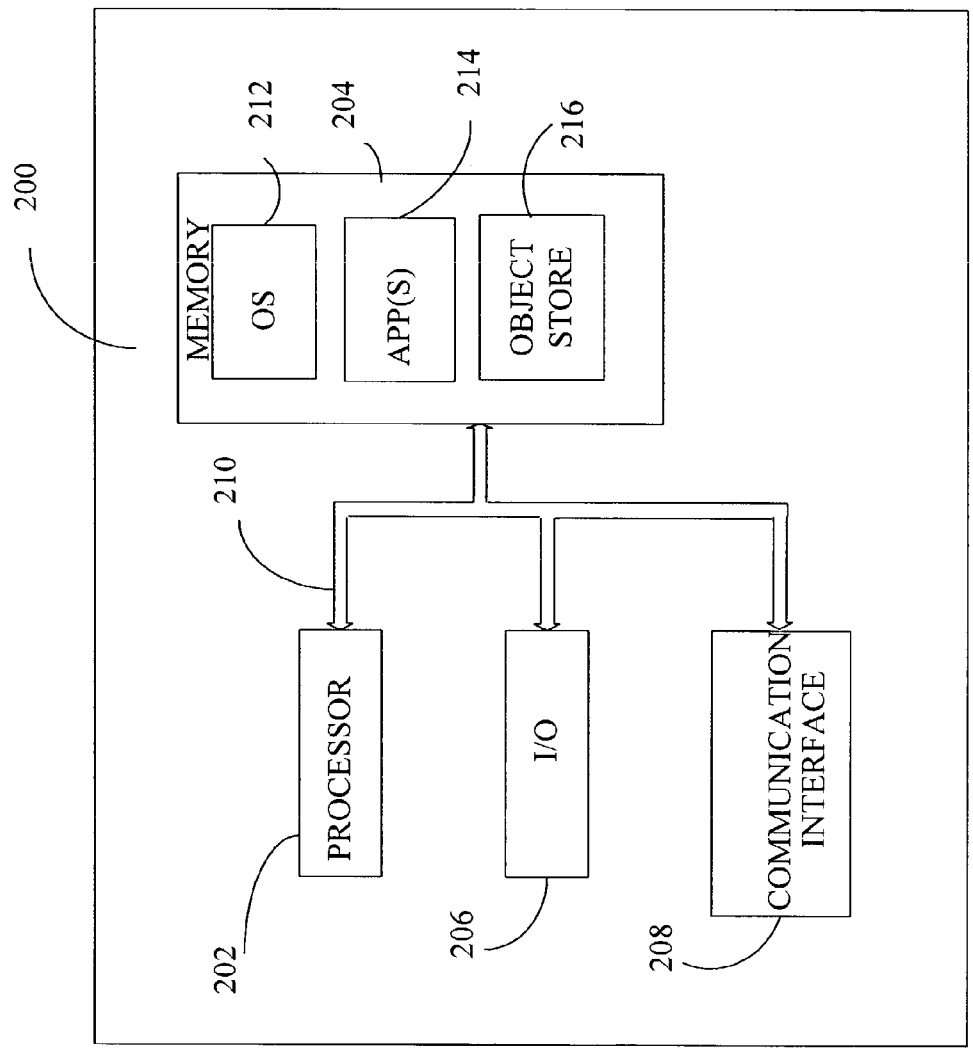
FIG. 2 is a block diagram of a mobile device in which the present invention may be practiced.

FIG. 2 is a block diagram of a mobile device 200, which is an exemplary computing environment. Mobile device 200 includes a microprocessor 202, memory 204, input/output (I/O) components 206, and a communication interface 208 for communicating with remote computers or other mobile devices. In one embodiment, the afore-mentioned components are coupled for communication with one another over a suitable bus 210.

Memory 204 is implemented as non-volatile electronic memory such as random access memory (RAM) with a battery back-up module (not shown) such that information stored in memory 204 is not lost when the general power to mobile device 200 is shut down. A portion of memory 204 is preferably allocated as addressable memory for program execution, while another portion of memory 204 is preferably used for storage, such as to simulate storage on a disk drive.

Memory 204 includes an operating system 212, application programs 214 as well as an object store 216. During operation, operating system 212 is preferably executed by processor 202 from memory 204. Operating system 212, in one preferred embodiment, is a WINDOWS® CE brand operating system commercially available from Microsoft Corporation. Operating system 212 is preferably designed for mobile devices, and implements database features that can be utilized by applications 214 through a set of exposed application programming interfaces and methods. The objects in object store 216 are maintained by applications 214 and operating system 212, at least partially in response to calls to the exposed application programming interfaces and methods.

Communication interface 208 represents numerous devices and technologies that allow mobile device 200 to send and receive information. The devices include wired and wireless modems, satellite receivers and broadcast tuners to name a few. Mobile device 200 can also be directly connected to a computer to exchange data therewith. In such cases, communication interface 208 can be an infrared transceiver or a serial or parallel communication connection, all of which are capable of transmitting streaming information.

Input/output components 206 include a variety of input devices such as a touch-sensitive screen, buttons, rollers, and a microphone as well as a variety of output devices including an audio generator, a vibrating device, and a display. The devices listed above are by way of example and need not all be present on mobile device 200. In addition, other input/output devices may be attached to or found with mobile device 200 within the scope of the present invention.

Figure 3:
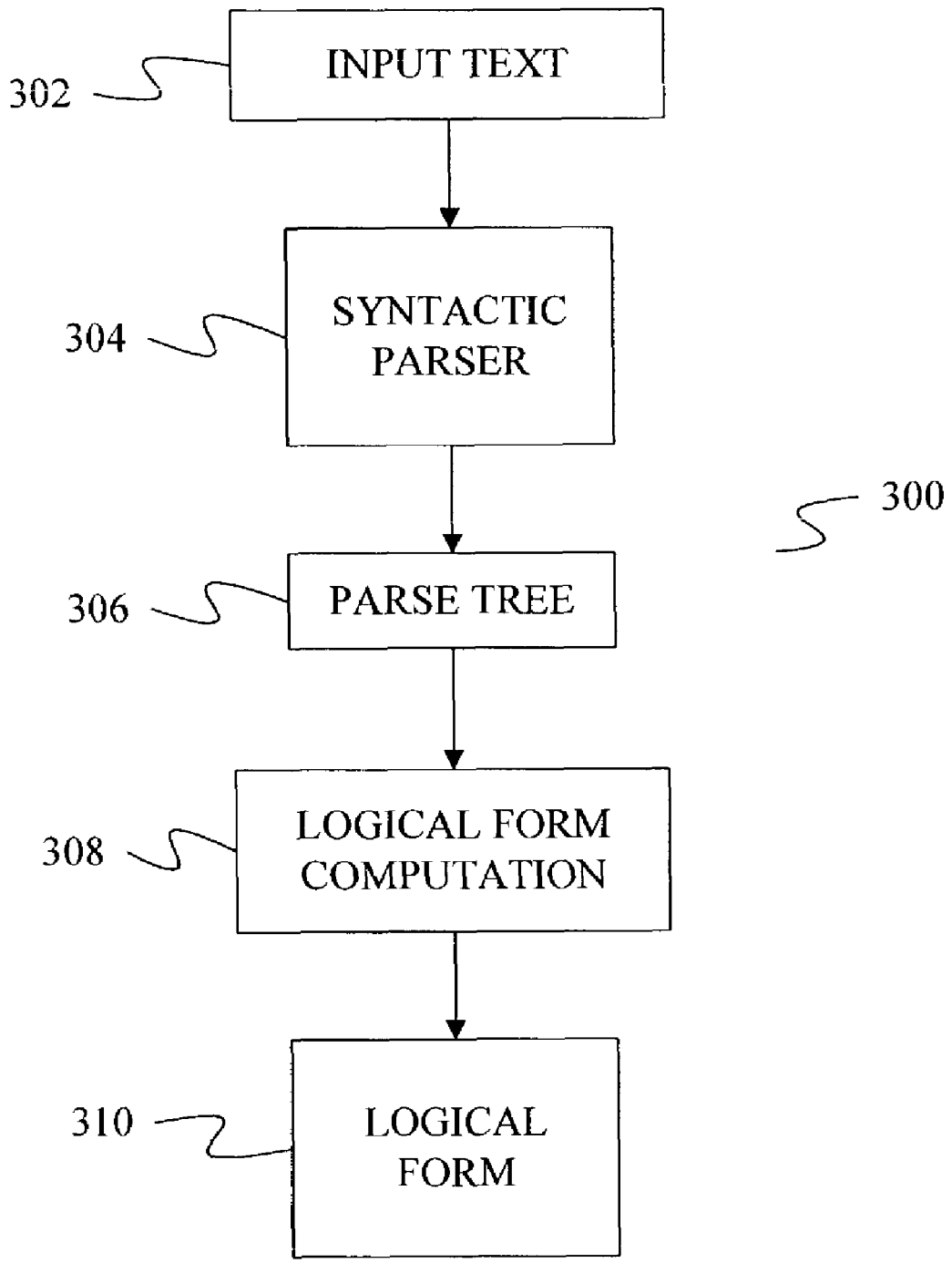
FIG. 3 is a block diagram of a natural language processing system.

The present invention is a natural language parser. Such parsers are used in a number of contexts including a natural language processing (NLP) system such as NLP 300 of FIG. 3.

NLP system 300 converts a text 302 into a logical form 310, which represents the semantic meaning of the text in a generalized form. To produce logical form 310, a natural language parser 304 generates a syntactic parse tree 306 from a text 302. Syntactic parse tree 306 provides a hierarchical representation of the syntactic structure of the text. Syntactic parse tree 306 is then generalized by a logical form generator 308 to produce logical form 310.

Figure 4:
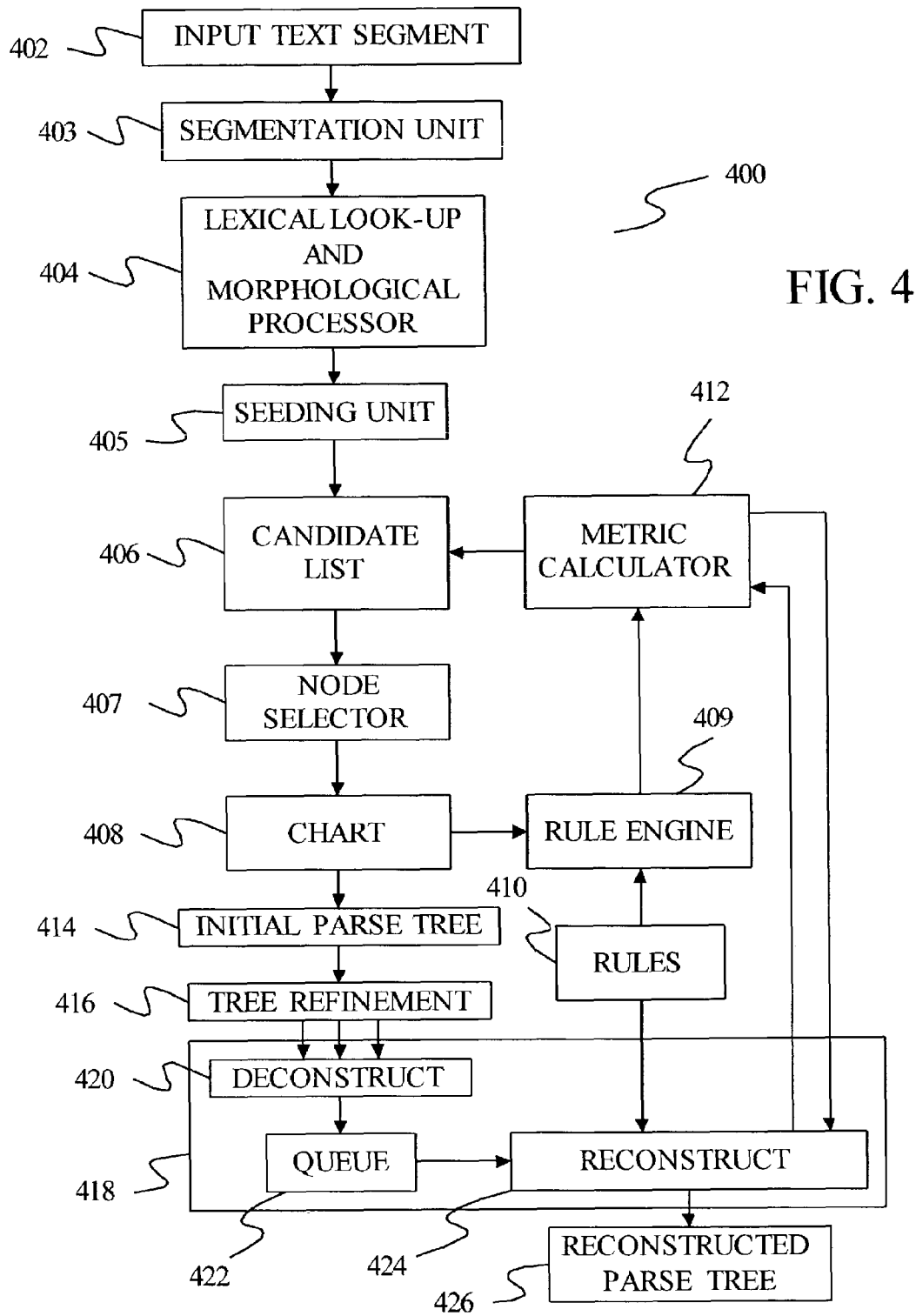
FIG. 4 is a block diagram of a syntactic parser with reattachment under one embodiment of the present invention.

FIG. 4 provides a block diagram of a natural language parser 400 in which the present invention may be practiced. In parser 400, a segmentation unit 403 divides an input text segment 402 into individual words, which are passed to a morphological processor and lexicon look-up 404 to identify possible parts of speech for each word. Under some embodiments, the morphological processor normalizes the morphological form of the words, if needed, before the words are applied against the lexicon to find the parts of speech. Each word/part-of-speech pair that is identified from the text segment forms a token that is inserted in a candidate list 306 as a starting node by a seeding unit 405.

An initial parse tree is then constructed through an iterative process. During each iteration, a single candidate node is promoted from candidate list 406 to a node chart 408 by a node selector 407. The promoted node is then tested against rules in a rule grammar 410 by a rule engine 409 to see if the promoted node can be transformed into a higher level node using one of the rules. This can occur by applying a unary rule to the promoted node by itself or by applying a rule that combines the promoted node with one or more of the nodes in node chart 408.

During testing, the phrase types of the nodes under consideration are compared to the phrase types required by a rule. For example, a rule may take a verb phrase and a noun phrase to form a larger verb phrase. For such a rule, the promoted node and at least one other node in the node chart must provide the phrase types of noun phrase and verb phrase in order for the conditions of the rule to be satisfied. If the appropriate phrase types are not present in the node chart, the next rule in rule set 410 is examined.

Note that under some embodiments, the rules have additional conditions beyond the phrase types. For example, a rule may require number agreement (singular or plural) between a noun phrase and a verb phrase. In addition, the rule may require a particular phrase level for one or more of the constituent nodes.

When the node chart contains nodes that satisfy a rule, the rule is executed to form a new node. This execution includes determining the values for a set of attributes that describe the structure of the node as well as the values for attributes that define relationships found in the clause represented by the node. For example, the subject, object, indirect object, and lemma form of a head verb in a clause may be determined as well as the first token and last token spanned by the node.

The new node formed by executing the rule may then be scored using a metric calculator 412. The score, if any, assigned to a node, is then used to determine which node to promote next to the chart. Any of a large number of different metrics may be used to score the node. For example, the frequency of the node type, the parts of speech of the tokens to the immediate left and right of the node, the headword associated with the node, the phrase level of the node and the syntactic history of the node may all be used. One type of metric, known as a Statistical Goodness Measure (SGM), determines a score for the node based on probabilities associated with one or more of the factors listed above.

The scored node is inserted into candidate list 406. Under some embodiments, candidate list 406 is sorted based on the score of each node, so that the node with the highest score is at the top of the candidate list. At the beginning of the next iteration, this top-most candidate node is promoted to the node chart.

The iterations described above continue until one or more nodes are formed in node chart 408 that span the entire input segment. At least one of these final nodes is then selected as an initial parse tree 414.

A tree refinement module 416 then walks through the tree, typically from top-to-bottom, to determine if the tree can be improved. In particular, tree refinement module 416 looks for nodes that can be reattached in different positions in the tree to improve the tree. If tree refinement module 416 locates a node that should be moved within the tree, it passes this reattachment information to a reattachment module 418. In particular, refinement module 416 passes the initial parse tree, the identity of the node to be moved (referred to as the reattach node), the identity of the node that the reattach node should be attached to (referred to as the target node), and the rule to use to combine the reattach node and the target node.

Under the present invention, reattachment module 418 reattaches the reattach node to the target node by first selectively deconstructing the parse tree using a deconstruct unit 420. This produces an ordered list of nodes and rules that is placed in a deconstruct queue 422. A reconstruct unit 424 then executes the rules in the deconstruct queue to form a reconstructed tree 426. A queue is a data structure that maintains the order in which elements are added, such that the first element added to the tail of the queue will be the first element removed from the head of the queue. Note that other data structures may be used with the present invention instead of a queue.

The operation of deconstruct unit 420 is best understood by first examining the operation of reconstruct unit 424.

Figure 5:
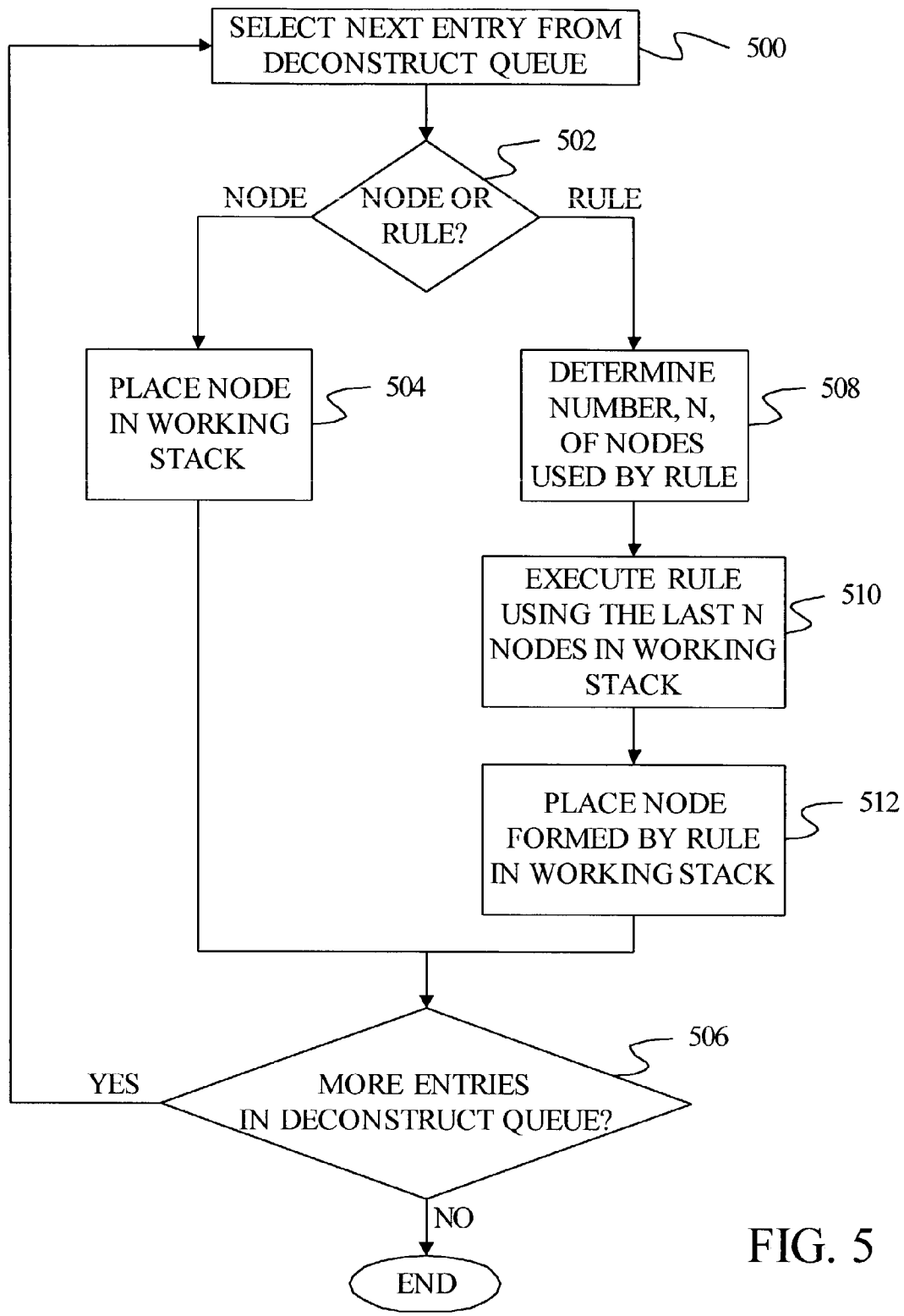
FIG. 5 is a flow diagram of a method of reconstructing a parse tree from a deconstruct queue under an embodiment of the present invention.

FIG. 5 provides a flow diagram of the operation of reconstruct unit 424. The process of FIG. 5 is described below with reference to the deconstruct queue, where the top represents the head of the queue:

| ENTRY NUMBER | NODE/RULE ID | NODE OR RULE |
|---|---|---|
| 1 | BEGIN1 | NODE |
| 2 | NP5 | NODE |
| 3 | VP1 | NODE |
| 4 | AJP1 | NODE |
| 5 | NP2 | NODE |
| 6 | NPwDet | RULE |
| 7 | VPwNPobj1 | RULE |
| 8 | PP2 | NODE |
| 9 | VPwPPcomp | RULE |
| 10 | VPwNPsubj | RULE |
| 11 | CHAR1 | NODE |
| 12 | Sent | RULE |

Figure 11:
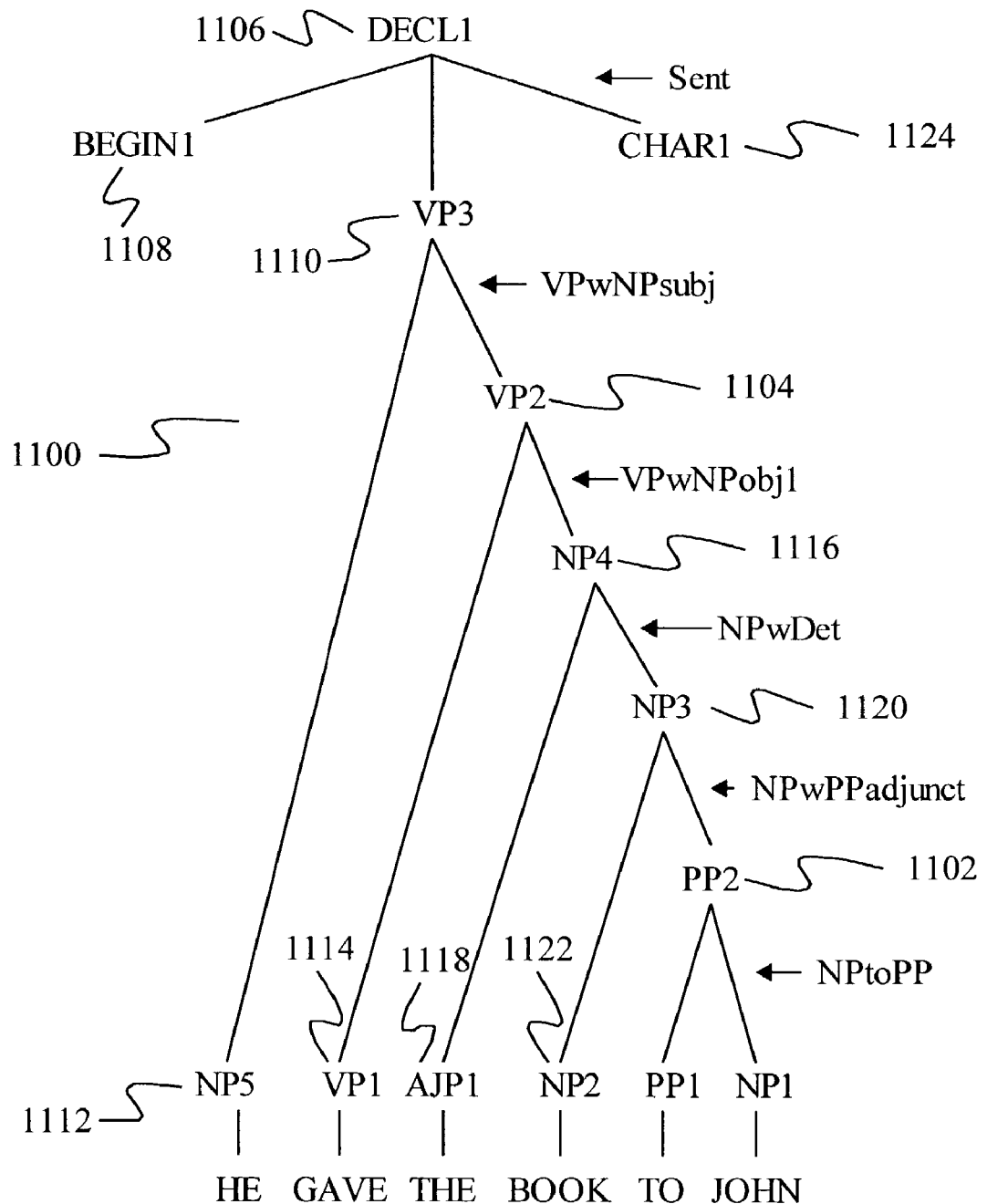
FIG. 11 is an example of an initial parse tree in which a reattach node is found below a target node.

This queue is produced for the sentence "He gave the book to John", which has an initial parse tree as shown in FIG. 11.

At step 500 of FIG. 5, the entry at the head of the queue is selected. For the queue shown above, this involves selecting the node BEGIN1.

At step 502, the selected entry is examined to determine if it is a rule or a node. If it is a node, it is placed in a working stack at step 504. After a node has been placed at the top of the working stack, the deconstruct queue is examined at step 506 to determine if there are any additional entries. If there are more entries at step 506, the process returns to step 500, and the next entry at the head of the deconstruct queue is selected. Thus, for the deconstruct queue listed above, five iterations through steps 500, 502, 504, and 506, produces a working stack containing the following list, where NP2 is at the top of the working stack:

NP2
AJP1
VP1
NP5
BEGIN1

If the entry selected from the head of the deconstruct queue is identified as a rule at step 502, the number of nodes, N, required by the rule is determined at step 508. At step 510, the N topmost nodes are removed from the top of the working stack, and the rule is then executed using its definition in rule grammar 410 and the N topmost nodes as input. The resulting node formed by the rule is placed at the top of the working stack.

Figure 6:
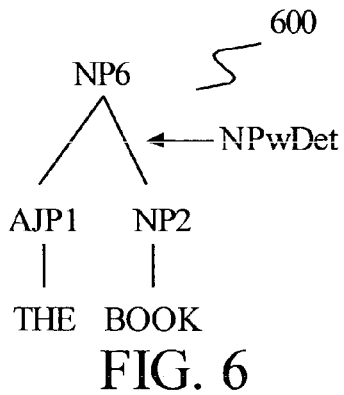
FIGS. 6-10 are sub-structures that show the progressive building of a reconstructed parse tree using the method shown in FIG. 5.

For example, when the rule NPwDet is read from the head of the deconstruct queue, nodes NP2 and AJP1 are removed from the top of the working stack, and the rule NPwDet is applied using these two nodes as its input. This results in the formation of parse structure 600 shown in FIG. 6, in which NP6 is the newly formed node created by the execution of the rule. Note that as shown in FIG. 6, in most embodiments, the nodes appear in the structure in a left-to-right manner based on their ordering in the working stack. Thus, since AJP1 was below NP2 in the working stack, it appears to the left of NP2 in the parse structure. After execution of the rule, the working stack contains:

NP6
VP1
NP5
BEGIN1

The process of FIG. 5 continues until there are no more entries in the deconstruct queue. At that point, the reconstructed parse tree is fully formed.

Figure 7:
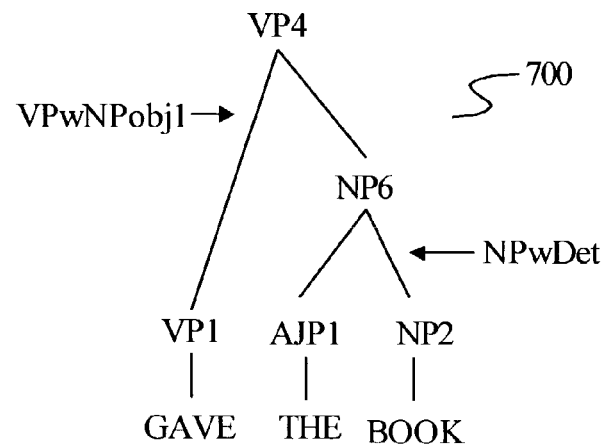

For example, after parse structure 600 is formed, rule VPwNPobj1 is removed from the head of the deconstruct queue at step 500. When this rule is executed, nodes NP6 and VP1 are applied to the rule producing parse structure 700 of FIG. 7 and modifying the working stack so that it becomes:

VP4
NP5
BEGIN1

Figure 8:
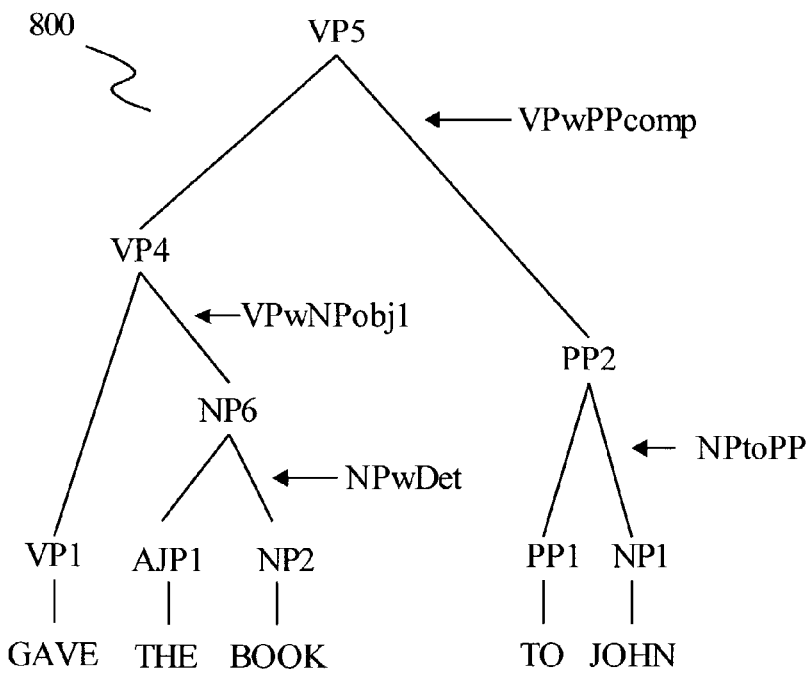

During the next iteration through the loop of FIG. 5, node PP2 is added to the working stack. Rule VPwPPcomp is then executed using node PP2 and VP4 to produce parse structure 800 of FIG. 8. After parse structure 800 is formed, the working stack appears as:

VP5
NP5
BEGIN1

Figure 9:
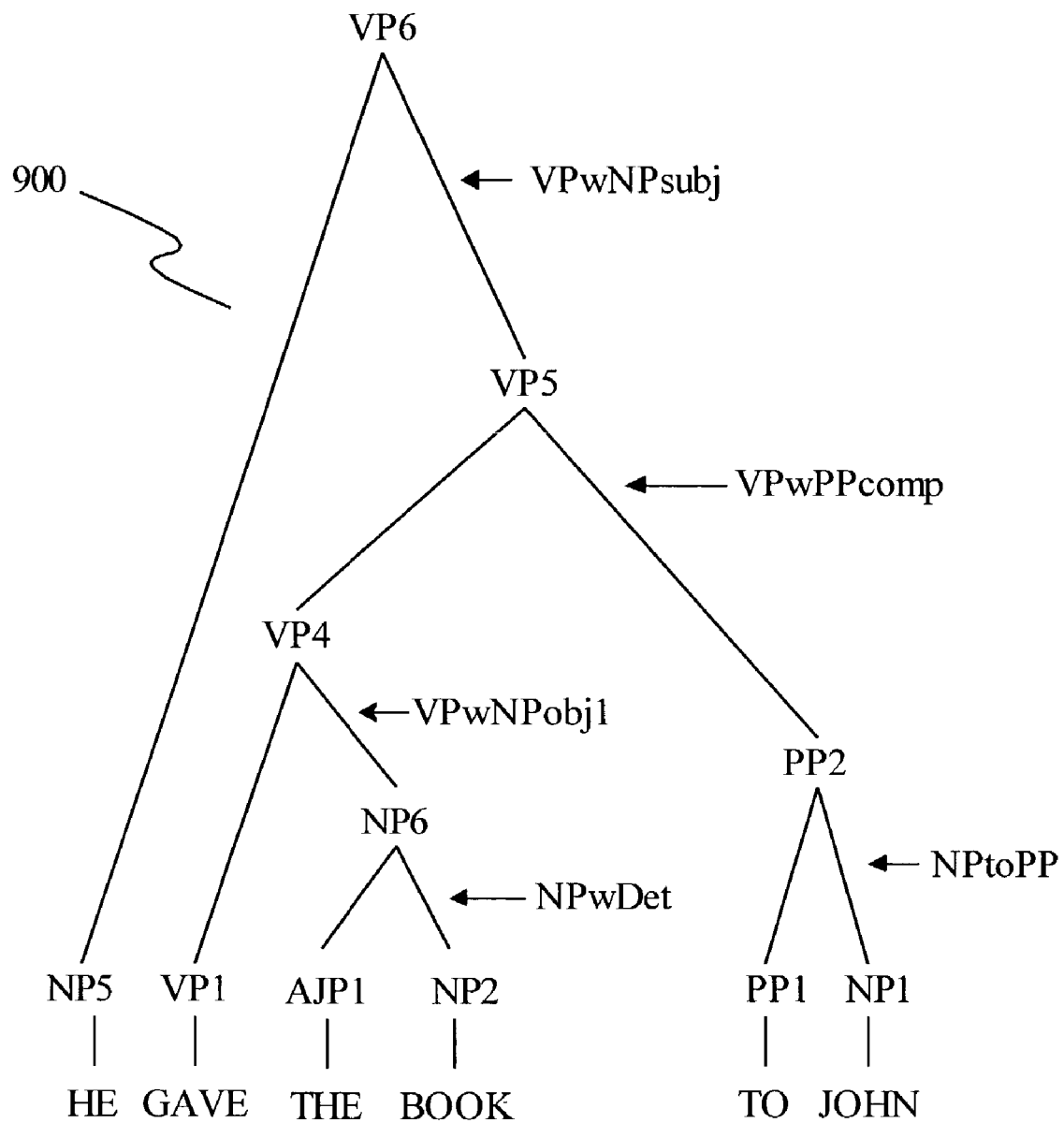

Rule VPwNPsubj is then executed on the next iteration using nodes VP5 and NP5. This results in parse structure 900 of FIG. 9 and changes the working stack to:

VP6
BEGIN1

Figure 10:
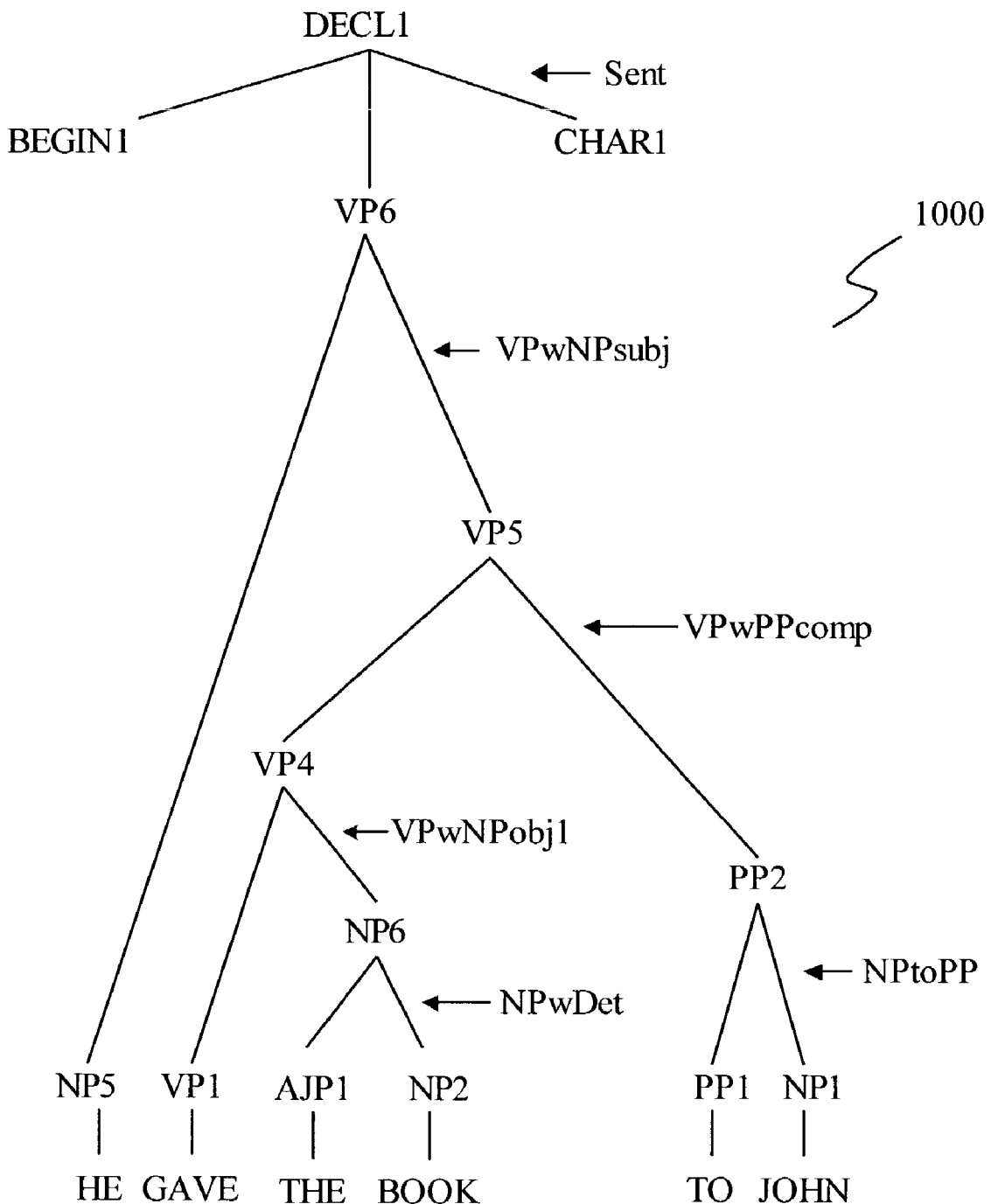

During the next iteration, node CHAR1 is added to the working stack. The following iteration takes the rule Sent from the head of the deconstruct queue and executes the rule using the three entries in the working stack. This produces parse structure 1000 of FIG. 10. At this point, there are no further entries in the deconstruct queue and the process of FIG. 5 ends at step 514 with parse structure 1000 representing the reconstructed parse tree.

Note that when executing rules, reconstruct unit 424 uses the definition of the rules in rule grammar 410. As a result, when a rule is modified in rule grammar 410 to implement a change in the formation of initial parse trees, the change is automatically propagated to the formation of reconstructed parse trees.

Also note that since the reconstructed parse tree is formed in the same manner as the initial parse tree, the nodes in the reconstructed tree are as formally correct as any initially formed trees. In particular, the attribute-value pairs defined for a node by the rule used to construct the node are assured to be as correct as in an originally constructed tree. This also means that post processing may be performed on the reattached trees in the same manner that it is performed on trees without reattachment. In particular, a reconstructed parse tree can be scored by metric calculator 412 in the same manner that nodes in the initial parse trees are scored. This allows initial parse trees and reconstructed parse trees to be compared in a meaningful way.

Note that under some embodiments, not all of the rules used in initial attachment are used during reattachment. Likewise, under some embodiments, there are rules that are only executed as part of reattachment.

As shown above, under many embodiments of the present invention, reconstruct unit 424 does not make decisions about how the nodes should be combined to form the reconstructed parse tree. Instead, it simply follows the order of the nodes and rules provided by deconstruct unit 420. As such, deconstruct unit 420 must populate the deconstruct queue so that the reattach node is connected properly to the target node in the reconstructed parse tree.

The manner in which the deconstruct queue is populated depends on the type of reattachment being performed. In general, there are two types of reattachment. In the first type, the target node spans the reattachment node such that the target node must be redefined as part of moving the reattachment node. In the second type, the tokens spanned by the reattachment node are next to the tokens spanned by the target node such that the reattachment node can be moved without redefining the target node.

Figure 12:
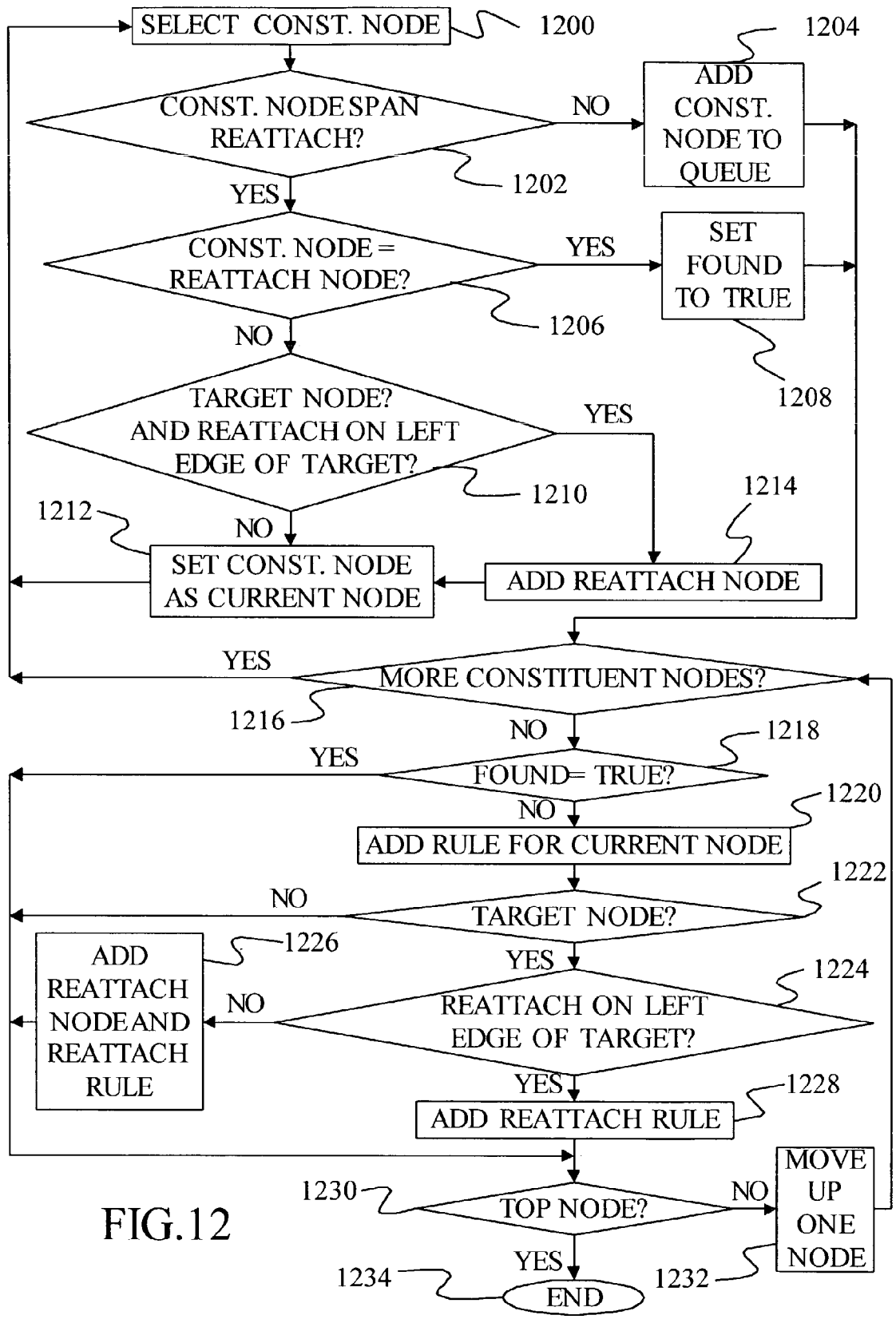
FIG. 12 is a flow diagram for deconstructing an initial parse tree in which a reattach node is positioned below the target node.

FIG. 12 provides a flow diagram for deconstructing a parse tree as part of reattaching a node that is spanned by the target node. The flow diagram is described below with reference to initial parse tree 1100 shown in FIG. 11 for the sentence "He gave the book to John".

In initial parse tree 1100, the sentence has been parsed as "He (gave (the book to John))". However, a more accurate parse would be "He (gave (the book)(to John))". Thus, given initial parse tree 1100, tree refinement unit 416 will identify node 1102 for the prepositional phrase "to John" as the reattach node, and node 1104 for the verb phrase "gave the book to John" as the target node. As can be seen in FIG. 11, reattach node 1102 is spanned by target node 1104.

The process of FIG. 12 begins by setting the top node of the parse tree as a current node. A constituent of the current node is then selected at step 1200. In most embodiments, selection step 1200 is performed in a left-to-right manner such that the left-most constituent is selected first.

At step 1202, the selected constituent is examined to determine if its span includes the reattach node. In other words, are all of the tokens beneath the reattach node also found beneath the selected constituent node. If the span of the constituent node does not include the reattach node, the constituent will not be affected by the reattachment. As a result, the constituent node can be placed at the tail of the deconstruct queue at step 1204.

If the constituent node spans the reattach node, the constituent node is examined at step 1206 to determine if it is the reattach node. If it is the reattach node, a "FOUND" flag is set at step 1208 for the current node (the constituent node's parent). This "FOUND" flag is used later in step 1218 to control whether a rule should be added to the tail of the deconstruct queue.

If the constituent node is not the reattach node at step 1206, the constituent node is examined to determine if it is the target node at step 1210. If it is the target node, and the span of the reattach node shares the same first token as the target node (in other words, the reattach node is on the left edge of the target node), the reattach node is added to the tail of the deconstruct queue at step 1214. The reattach node is added to the tail of the deconstruct queue at step 1214 to maintain the left-to-right relationship of the reattach node and the target node when the tree is reconstructed by reconstruct unit 424.

After the reattach node is added at step 1214 or if the constituent node is not the target node or the reattach node is not on the left edge of the target node at step 1210, the process of FIG. 12 continues at step 1212. In step 1212, a recursion is performed by setting the constituent node as the current node and returning to step 1200. This moves the process down one level in the tree toward the reattach node, which is known to be below the constituent node because of the examinations performed in step 1202.

At each level of the recursion, the constituents are examined in a left-to-right manner. If a constituent does not span the reattach node, it is added to the tail of the deconstruct queue at step 1204 and if there are more constituents at that level at step 1216, the next constituent is selected at step 1200. Similarly, if a constituent node is the reattach node at step 1206, the "FOUND" flag is set at step 1208 for the current node and the next constituent at the current level, if any, is examined.

Since the recursion moves down a level when it encounters a constituent that spans the reattach node, not all constituents on a level will necessarily be considered before moving down to the next level. These constituents will be examined, however, after the reattach node is found as discussed further below.

When the process reaches the node that has the reattach node as a constituent, the "FOUND" flag will be set and all of the other constituents of the node will be added to the tail of the deconstruct queue through step 1204.

The process of moving down through the initial parse tree as described above can be seen in detail by examining initial parse tree 1100 of FIG. 11. At first, the current node is set to top node 1106. At step 1200, constituent 1108 of the top node is selected and examined at step 1202. Because constituent node 1108 does not span reattach node 1102, it is added to the tail of the deconstruct queue at step 1204 creating a deconstruct queue of:

BEGIN1

At step 1216, it is determined that there are additional constituents under node 1106 and at step 1200, constituent 1110 is selected. Constituent node 1110 does span reattach node 1102, however it is not the reattach node itself and it is not the target node. As a result, the process moves to step 1212 through steps 1202, 1206, and 1210. At step 1212, a recursion is performed such that node 1110 becomes the current node and the first constituent of that node, node 1112 is selected at step 1200.

Constituent node 1112 does not span the reattach node, and as such is added to the tail of the deconstruct queue at step 1204 to produce a queue of:

BEGIN1
NP5

The next constituent of node 1110 is then selected, which is node 1104. Since node 1104 spans the reattach node but is not the reattach node, the process moves to step 1210 where node 1104 is compared to the target node. Since node 1104 is the target node, the starting token of the reattach node and the starting token of the target node are examined to determine if the reattach node is on the left edge of the target. It is clear from FIG. 11 that the reattach node is not along the left edge of the target but instead is along the right edge. As such, the reattach node does not have to be added to the tail of the deconstruct queue at this point and a second recursion is performed at step 1212.

With the second recursion, node 1104 becomes the current node and its first constituent, node 1114 is selected at step 1200. This constituent does not span the reattach node, so it is added to the tail of the deconstruct queue at step 1204 to form a queue of:
 BEGIN1
 NP5
 VP1

The next constituent, node 1116, is then selected at step 1200. This constituent does span the reattach node, but is not the reattach node nor the target node. As a result, another recursion is performed without adding anything to the tail of the deconstruct queue.

The first constituent of node 1116 is node 1118, which does not span the reattach node. As a result, node 1118 is added to the tail of the deconstruct queue at step 1204 to produce:
 BEGIN1
 NP5
 VP1
 AJP1

The next constituent of node 1116 is node 1120, which does span the reattach node but is not the reattach node nor the target. Thus, an additional recursion is performed at step 1212 to make node 1120 the current node without changing the deconstruct queue.

The first constituent of node 1120 is node 1122. Since this node does not span the reattach node, it is added to the tail of the deconstruct queue at step 1204 to produce a queue of:
 BEGIN1
 NP5
 VP1
 AJP1
 NP2

The next constituent of node 1120 is node 1102. This node spans the reattach node at step 1202 and is found to be the reattach node at step 1206. As a result, the "FOUND" flag is set to true for node 1120 at step 1208.

Returning to step 1216, there are no further constituents for current node 1120. When each of the constituents at a level have been processed, step 1216 will indicate that there are no more constituents and the process will continue at step 1218 where the "FOUND" flag is examined to determine if the current node has the reattach node as a constituent.

If the "FOUND" flag is set, the process continues at step 1230, where the current node is examined to determine if it is the top node. If it is not the top node, the process is moved up one level in the tree at step 1232 by making the parent node of the current node the new current node.

Note that if the "FOUND" flag is set, the rule used in the initial parse tree to combine the reattach node with its siblings is not added to the tail of the deconstruct queue before moving up to the next level. The reason for this is that since the reattach node is being moved, the rule for combining it with its siblings is not needed to form the reconstructed parse tree.

The new current node is examined at step 1216 to determine if there are any other constituent nodes that have not been processed. Such constituent nodes, if they are present, would not have been processed if they were to the right of a node that spanned the reattach node.

In the case of the parse tree of FIG. 11, there are no further constituent nodes for node 1116. As a result, the process returns to step 1218 to determine if the "FOUND" flag has been set for node 1116. Note that although the "FOUND" flag was set for node 1120, it has not been set for node 1116. Thus, when the "FOUND" flag is set for a current node it does not propagate upwards to the parent nodes of the current node. As such, the process moves from step 1218 to step 1220 where the rule used to form the current node is added to the tail of the deconstruct queue. This produces a queue of:
 BEGIN1
 NP5
 VP1
 AJP1
 NP2
 NPwDet At step 1222, the current node is examined to determine if it is the target node. Since node 1116 is not the target node, the process continues at steps 1230 and 1232 where the process moves up one level by selecting the parent of the current node, node 1104, as the new current node.

Since node 1104 does not have any constituents that have not been processed, the process moves through step 1216 and back to step 1218. At step 1218, the "FOUND" flag is not true for node 1104, so the process moves to step 1220 where the rule for forming node 1104 is added to the tail of the deconstruct queue to produce:
 BEGIN1
 NP5
 VP1
 AJP1
 NP2
 NPwDet
 VPwNPobj1

After step 1220, node 1104 is examined at step 1222 and is determined to be the target node. When the target node is reached while moving up through the parse tree, the deconstruct queue includes a new definition for the target node that does not include the reattach node. For example, in the deconstruct queue produced thus far for initial parse tree 1100:
 BEGIN1
 NP5
 VP1
 AJP1
 NP2
 NPwDet
 VPwNPobj1 elements:
 VP1
 AJP1
 NP2
 NPwDet
 VPwNPobj1 define the target without the reattach node. Thus, AJP1 and VP are to be combined by rule NPwDet to form a new node that is to be combined with VP1 by rule VPwNPobj1 to form the target node.

As such, to reattach the reattach node to the target node, the rule for reattachment must be added to the tail of the deconstruct queue when the target node is encountered during the movement up through the parse tree. Before adding the reattach rule, the process of FIG. 12 determines at step 1224 if the reattach node has already been added to the tail of the deconstruct queue. This would have occurred at step 1214 on the way down through the parse tree if the reattach node was found on the left edge of the target node. Thus, to determine if the reattach node is already in the deconstruct queue, the reattach node and the target node are examined to determine if the reattach node is on the left edge of the target. If the reattach node is on the left edge of the target node at step 1224, only the rule for reattachment has to be added to the tail of the deconstruct queue at step 1228. However, if the reattach node is not on the left edge of the target, both the reattach node and the reattach rule must be added to the tail of the deconstruct queue at step 1226. In the example of FIG. 11, step 1226 produces a deconstruct queue of:

BEGIN1
NP5
VP1
AJP1
NP2
NPwDet
VPwNPobj1
PP2
VPwPPcomp where VPwPPcomp is the rule for attaching the reattach node to the target node.

After step 1226 (or step 1228), the process continues at steps 1230 and 1232, where the parent node of the current node is made the new current node. Thus, node 1110 becomes the new current node.

Node 1110 does not have any more constituents to process and the "FOUND" flag is not set for the node. As a result, the rule for forming node 1110 is added to the tail of the deconstruct queue at step 1220 to produce a queue of:

BEGIN1
NP5
VP1
AJP1
NP2
NPwDet
VPwNPobj1
PP2
VPwPPcomp
VPwNPsubj

Since node 1110 is not the target node at step 1222, the process continues at steps 1230 and 1232 where the node 1106 is made the current node.

Node 1106 does have a constituent node that has not been processed. As a result, constituent node 1124 is selected at step 1200. Since this node does not span the reattach node, it is added to the tail of the deconstruct queue at step 1204 to produce a queue of:

BEGIN1
NP5
VP1
AJP1
NP2
NPwDet
VPwNPobj1
PP2
VPwPPcomp
VPwNPsubj
CHAR1

After step 1204, all of the constituents for current node 1106 have been processed. Thus, the method continues at step 1218 where the "FOUND" flag is determined to have not been set for current node 1106. As a result, the rule for forming node 1106 is added to the tail of the deconstruct queue at step 1220 to produce a queue of:

BEGIN1
NP5
VP1
AJP1
NP2
NPwDet
VPwNPobj1
PP2
VPwPPcomp
VPwNPsubj
CHAR1
Sent

Since node 1106 is not the target node, the process continues through step 1222 to step 1230 where it is determined that node 1106 is the top node. As a result, the deconstruct process ends at step 1234 with the deconstruct queue in a final condition of:

BEGIN1
NP5
VP1
AJP1
NP2
NPwDet
VPwNPobj1
PP2
VPwPPcomp
VPwNPsubj
CHAR1
Sent

Note that this deconstruct queue is the same deconstruct queue that was used above to describe the operation of reconstruct unit 324. Thus, this deconstruct queue produces the reconstructed parse tree of FIG. 10 in which it can be seen that the PP2 reattach node has been reattached to the VP4 target node, where VP4 represents target node 1104 of FIG. 11 as redefined without the PP2 reattach node.

Figure 13:
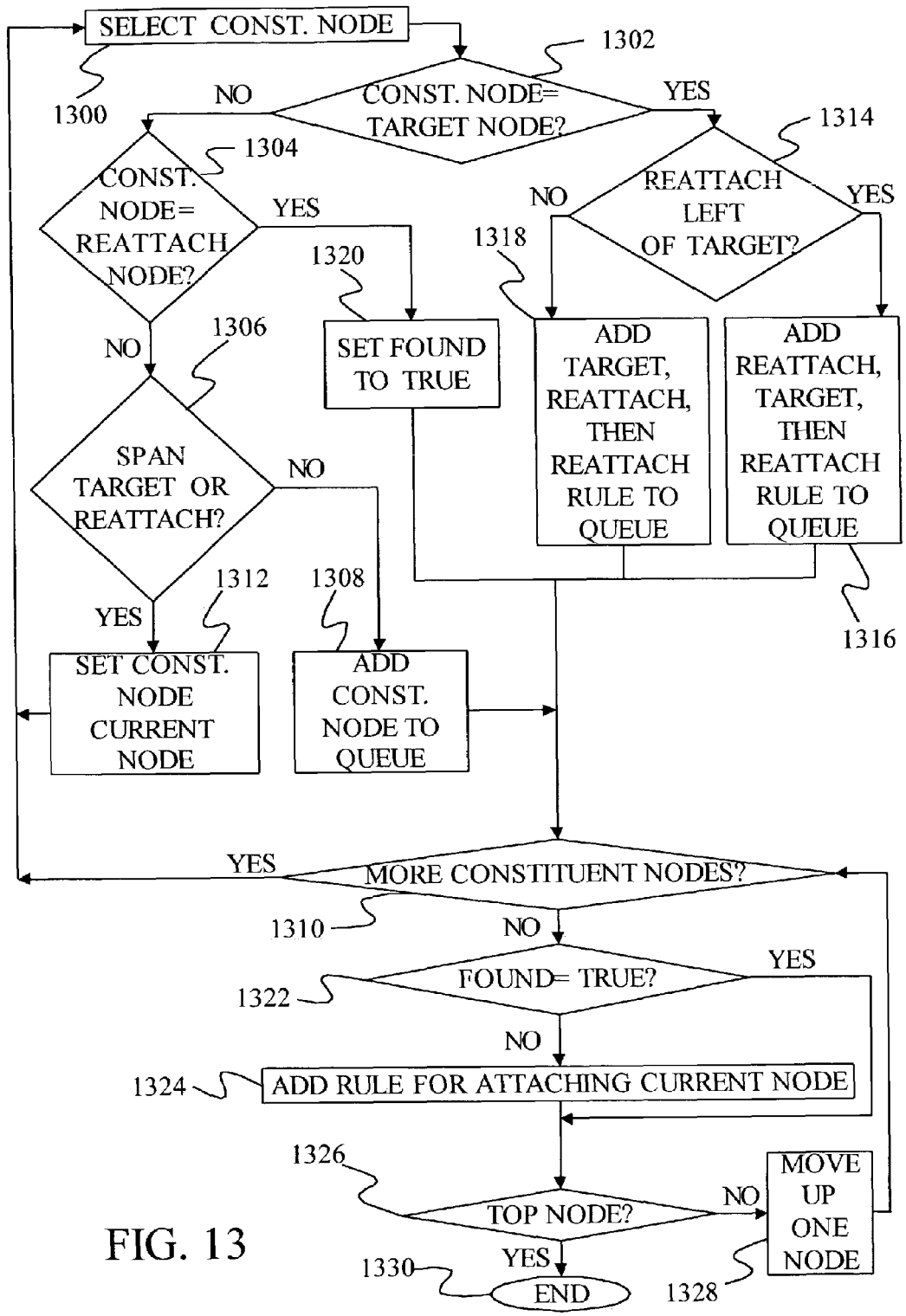
FIG. 13 is a flow diagram for deconstructing an initial parse tree in which a reattach node is not positioned below the target node.

FIG. 13 provides a flow diagram of a method of deconstructing a parse tree when the target node does not span the reattach node. For example, the method shown in FIG. 13 can be used to deconstruct initial parse tree 1400 of FIG. 14 in which reattach node 1402 is to be attached to target node 1404. Like the method of FIG. 12, the method of FIG. 13 moves through the tree in a left-to-right manner and recursively moves down the tree to locate nodes of interest.

Beginning with the top node as the current node, the process of FIG. 13 first selects the left-most constituent node of the current node at step 1300. Using the parse tree of FIG. 14, this involves selecting node 1406. At steps 1302 and 1304, the selected node is examined to determine if it is the target node or the reattach node. If it is neither, the node is examined at step 1306 to determine if it spans either the target node or the reattach node. If it does not span either of these nodes, it will not be affected by the reattachment and may be added directly to the tail of the deconstruct queue at step 1308. Thus, using the example of FIG. 14, the queue becomes:

BEGIN1

After the constituent has been added, the method determines if there are any other constituents for the current node at step 1310. If there are more constituents, the next constituent is selected at step 1300. Using the example of FIG. 14, this involves selecting constituent 1408.

Since node 1408 is not the target node or the reattach node, the process moves through steps 1302 and 1304 to 1306, where it is determined that constituent node 1408 spans the target node and the reattach node. The process then attempts to locate the target node and/or reattach node by recursively moving down the parse structure at step 1312. This is done by setting the constituent node as the new current node and returning to step 1300 to select the first constituent of the new current node. Thus, in step 1312, node 1408 becomes the new current node and node 1410 is selected as the constituent node in step 1300.

Since node 1410 is not the target node, is not the reattach node and does not span either of these nodes, it is added to the tail of the deconstruct queue at step 1308 to produce a queue of:
BEGIN1
NP2

Returning to step 1300, the next constituent node, node 1412 is selected. This node is neither the target node nor the reattach node but does span both the target node and the reattach node. As a result, the process moves down a level at step 1312 to make node 1412 the current node. At step 1300, constituent node 1404 is then selected.

Constituent node 1404 is determined to be the target node at step 1302. Since the target node is not affected by the movement of the reattach node, it must be explicitly added to the tail of the deconstruct queue when it is encountered. In addition, the reattach node and the rule for attaching the reattach node to the target node must also be added to the tail of the deconstruct queue.

The order in which the reattach node and the target node are added to the tail of the deconstruct queue must maintain the left-to-right relationship between the reattach node and the target node. Thus, at step 1314, the process determines if the reattach node is to the left of the target node. If the reattach node is to the left of the target in the initial parse tree, the reattach node is added to the tail of the deconstruct queue before the target and the reattach rule at step 1316. If the reattach node is to the right of the target, the target node is added to the tail of the deconstruct queue before the reattach node and the reattach rule at step 1318.

In the example of FIG. 14, step 1318 produces a queue of:
BEGIN1
NP2
VP1
AVP1
VPwAVPr where VPwAVPr is the reattach rule.

After the target node, reattach node and reattach rule have been added to the tail of the deconstruct queue at steps 1316 or 1318, the next constituent of the current node is selected. For the example of FIG. 14 this involves selecting constituent 1414.

Constituent 1414 is neither the target node nor the reattach node but it does span the reattach node. Thus, the process follows steps 1302, 1304, and 1306 to step 1312, where it moves down to make node 1414 the current node. At step 1300, constituent node 1402 is selected.

Since constituent node 1402 is the reattach node, the process follows step 1304 to step 1320, where the "FOUND" flag is set for current node 1414. The next constituent, node 1416, is then selected at step 1300.

Since node 1416 is not the target node, is not the reattach node, and does not span either of these nodes, it is not affected by the reattachment and can be added to the tail of the deconstruct queue at step 1308. This produces a queue of:
BEGIN1
NP2
VP1
AVP1
VPwAVPr
PP2

After step 1308, there are no further constituents of current node 1414. As a result, the process continues from step 1310 to step 1322 where the current node is examined to see if the "FOUND" flag has been set. For node 1414, the "FOUND" flag has been set. This means that the reattach node is a constituent of the current node in the initial parse tree. Since the reattach node is being moved, the rule for attaching the reattach node to another constituent to form node 1414 needs to be removed. As such, it is not added to the tail of the deconstruct queue and the process continues at step 1326.

At step 1326, the method determines if the current node is the top node in the initial parse tree. If it is not the top node, the process moves up a node in the parse tree by making the parent of the current node the new current node. For the example in FIG. 14, this involves making node 1412 the current node. The process then returns to step 1310 to see if there are any constituent nodes of the new current node that were not processed on the way down the parse tree. If there are no further constituent nodes, the process continues at step 1322 where the "FOUND" flag is examined.

For node 1412, the "FOUND" flag has not been set even though it was set for node 1414. As a result, the process continues at step 1324, where the rule for forming node 1412 is added to the tail of the deconstruct queue. This produces a queue of:
BEGIN1
NP2
VP1
AVP1
VPwAVPr
PP2
VPwPPcomp After the rule has been added to the tail of the deconstruct queue at step 1324, the process moves up another node at step 1328 and returns through steps 1310 and 1322 for new current node 1408. At step 1324, the rule for forming node 1408 is added to the tail of the deconstruct queue to form a queue of:
BEGIN1
NP2
VP1
AVP1
VPwAVPr
PP2
VPwPPcomp
VPwNPsubj The process then moves up to node 1418 and returns to step 1310. At step 1310, constituent 1428 of current node 1418 has not been processed yet. As such, constituent 1428 is selected at step 1300. Since constituent 1428 is not the target node, is not the reattach node, and does not span either of these nodes, the constituent is added to the tail of the deconstruct queue at step 1308 to form a queue of:
BEGIN1
NP2
VP1
AVP1
VPwAVPr
PP2
VPwPPcomp
VPwNPsubj
CHAR1

Upon returning to step 1310, there are no more constituents for current node 1418 and the process continues at step 1322 where it is determined that the "FOUND" flag has not been set for node 1418. As a result, the rule for forming node 1418 is added to the tail of the deconstruct queue at step 1324 to produce a queue of:

BEGIN1
NP2
VP1
AVP1
VPwAVPr
PP2
VPwPPcomp
VPwNPsubj
CHAR1
Sent

At step 1326, it is determined that node 1418 is the top node and the deconstruct process ends at step 1330.

The resulting deconstruct queue can be used to form a reconstructed parse tree as shown in FIG. 15. Stepping through the deconstruct queue from head to tail, the first rule that is encountered is VPwAVPr which combines VP1 and AVP1 of the deconstruct queue to form node 1500. This is the reattachment of reattach node 1402 of FIG. 14 to target node 1404. Rule VPwPPcomp then combines node 1500 with PP2 from the deconstruct queue to form node 1502. Rule VPwNPsubj then combines NP2 from the deconstruct queue with node 1502 to form node 1504. Node BEGIN1 from the deconstruct queue is then combined with node 1504 and node CHAR1 from the deconstruct queue by rule Sent to form top node 1506.

Although the method of deconstructing parse trees has been shown as two separate methods, the invention can be practiced using a more integrated single method. In addition, the present invention is not limited to the particular steps used to form the deconstruct queue. Any series of steps that forms a data structure in which the left-to-right relationship of the tokens in the initial parse tree is maintained in the reconstructed tree and the bottom-to-top ordering of the rules is maintained can be used within the scope of the present invention.

In addition, although two examples of reattachment have been shown above, other types of reattachment may be performed with the present invention including reattachment to a right cousin, and reattachment along the left edge.

Because the reconstructed parse trees are formed by executing rules from the same rule grammar used to form the initial parse trees, the reconstructed parse trees can be scored in the same manner that the initial parse trees are scored. This means that the resulting scores for trees with and without reattachment can be compared in a meaningful way during sentence generation.

Figure 16:
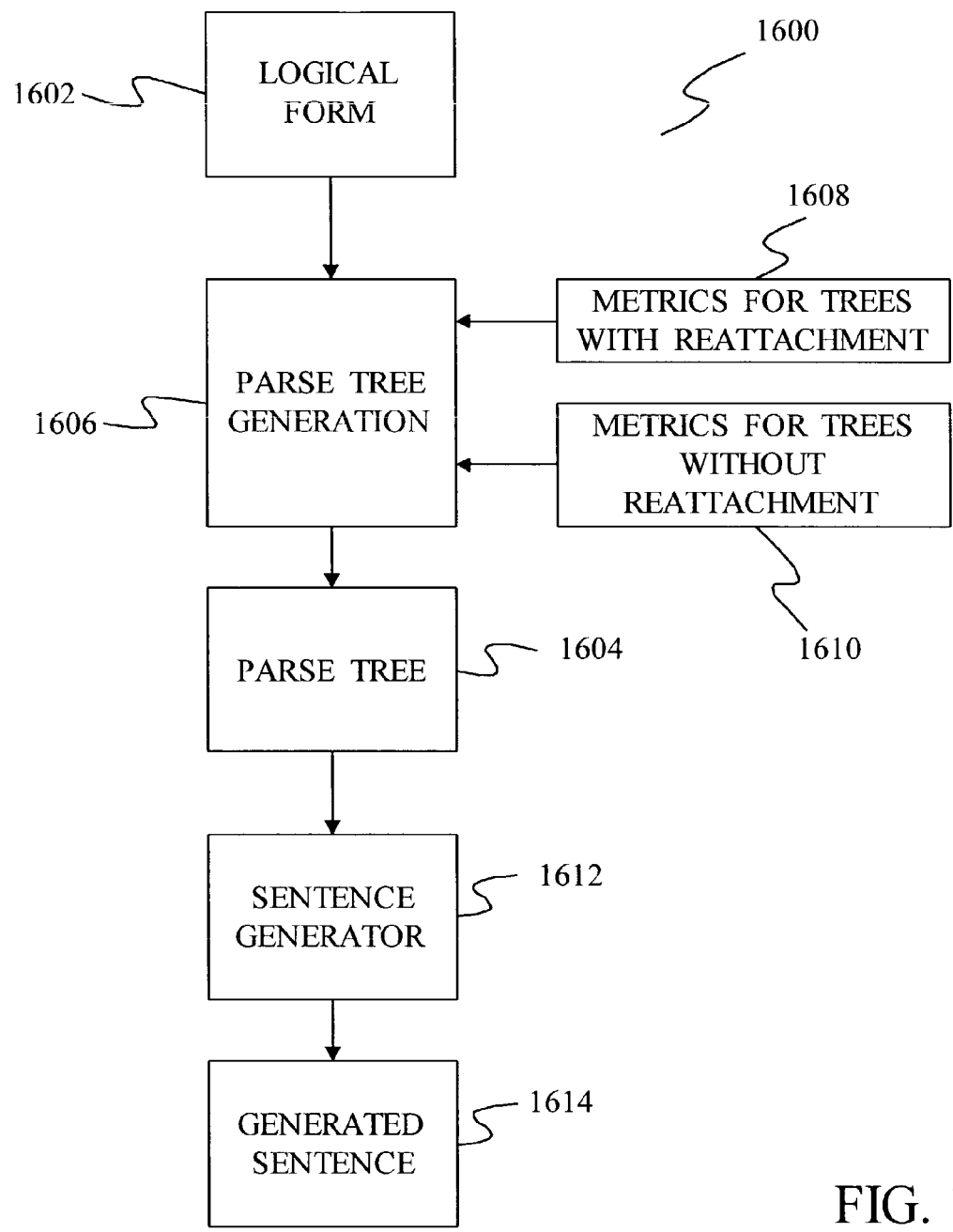
FIG. 16 is a block diagram of a sentence generation system under one embodiment of the present invention.

FIG. 16 provides a block diagram of a sentence generation system 1600. In system 1600, a logical form 1602 is converted into a parse tree 1604 by a parse tree generation unit 1606. To identify which of a number of possible parse trees is most probable given the logical form, the scores for the various parse trees are compared to each other. Since the scores of parse trees with and without attachment can be compared in a meaningful way, the metrics for trees with reattachment 1608 and the metrics for trees without reattachment 1610 are used directly by parse tree generation unit 1606 to identify parse tree 1604.

Once parse tree 1604 has been identified, a sentence generator 1612 selects words for the child nodes of the parse tree to form a generated sentence 1614.

Although the present invention has been described with reference to particular embodiments, workers skilled in the art will recognize that changes may be made in form and detail without departing from the spirit and scope of the invention. In particular, although the examples above use a token that represents a single word, in other examples of the invention a token can represent a phrase.

What is claimed is:

1. A method of forming a reconstructed parse structure for a text segment, the method comprising:
   a processor identifying a reattach node in an initial parse structure, where the reattach node is a node that is to be moved;
   the processor selecting nodes and rules used to form nodes associated with the initial parse structure constructed for the text segment;
   the processor placing the selected nodes and rules and at least one additional rule that is not taken from the initial parse structure in a deconstruction queue as an ordered list of entries wherein each node and each rule in the deconstruction queue appears in a separate respective entry in the ordered list of entries and wherein a rule used to combine the reattach node with another node in the initial parse structure is not placed in the deconstruction queue and wherein at least one selected node placed in the deconstruction queue is not affected by moving the reattach node;
   the processor sequentially retrieving entries from the deconstruction queue based on the order of the entries in the deconstruction queue;
   for each node retrieved from the deconstruction queue, the processor placing the node in a working stack; and
   for each rule retrieved from the deconstruction queue, including the additional rule:
      the processor determining the number of nodes required by the rule;
      the processor removing the determined number of nodes from the top of the working stack;
      the processor executing the rule using the nodes removed from the working stack to form a resulting node; and
      the processor placing the resulting node at the top of the working stack.

2. The method of claim 1 wherein executing the rules comprises forming a reconstructed parse structure that differs from the initial parse structure in that a node in the initial parse structure is moved to a different position in the reconstructed parse structure.

3. The method of claim 2 wherein the reattach node is beneath a target node in the initial parse structure and wherein executing the rules comprises executing rules to form a redefined target node in the reconstructed parse structure.

4. The method of claim 3 wherein executing the rules comprises executing the additional rule to combine the reattach node with the redefined target node in the reconstructed parse structure.

5. The method of claim 2 wherein the reattach node is not beneath a target node in the initial parse structure and wherein executing the additional rule comprises executing the additional rule to combine the reattach node with the target node in the reconstructed parse structure.

6. The method of claim 2 wherein selecting nodes comprises selecting fewer than all of the nodes in the initial parse structure.

7. The method of claim 6 wherein selecting fewer than all of the nodes comprises selecting a top node of a sub-structure but not the nodes in the sub-structure that are below the top node.

8. The method of claim 6 wherein selecting fewer than all of the nodes comprises not selecting a node if a target node is positioned in a sub-structure below the node.

9. The method of claim 8 wherein selecting a rule comprises selecting a rule used to form a node but not selecting the node.

10. The method of claim 1 further comprising performing post-processing on the reconstructed parse structure, the post-processing being performed in the same manner as it would for the initial parse structure.

11. A computer-readable storage medium having encoded thereon computer-executable instructions that when executed by a processor cause the processor to perform steps comprising:

forming an initial parse structure having multiple levels of nodes for an input text, each node above a lowest level formed by executing a respective rule that accepts at least one node from a lower level to form the node;

identifying one of the nodes in the initial parse structure as a reattach node;

forming a queue comprising a list of nodes and rules used to form the initial parse structure and at least one additional rule that accepts two nodes from a lower level to form a node, the list comprising a separate entry for each node and each rule, the queue formed by deconstructing the initial parse structure and adding the at least one additional rule to the queue, wherein the at least one additional rule is not deconstructed from the initial parse structure and wherein the queue does not include a rule that accepted the reattach node as a node from a lower level to form a node in the initial parse structure and wherein at least one node in the queue is not affected by moving the reattach node from its position in the initial parse structure; and forming a reconstructed parse structure based on the nodes and rules in the queue by:

sequentially retrieving entries from the queue based on the order of the entries in the queue;

for each node retrieved from the queue, placing the node in a working stack; and for each rule retrieved from the queue, including the at least one additional rule:

determining a number of nodes required by the rule;

removing the determined number of nodes from the top of the working stack;

executing the rule using the nodes removed from the working stack to form a resulting node for the reconstructed parse structure; and placing the resulting node at the top of the working stack.

12. The computer-readable storage medium of claim 11 wherein forming a queue comprises:

identifying a target node in the initial parse structure, wherein the reattach node was not combined with the target node by a rule to form another node in the initial parse structure;

selecting a reattach rule to combine the reattach node to the target node to form a node at a higher level from the target node in the reconstructed parse structure; and placing the reattach rule in the queue as the at least one additional rule.

13. The computer-readable storage medium of claim 12 wherein forming the reconstructed parse structure further comprises executing at least one rule to form a reconstructed target node and executing the reattach rule using the reconstructed target node and the reattach node.

14. The computer-readable storage medium of claim 13 wherein the reattach node is part of a sub-structure formed below the target node.

15. The computer-readable storage medium of claim 14 wherein forming the reconstructed target node comprises forming the reconstructed target node such that the reattach node is not present in the sub-structure below the reconstructed target node.

16. The computer-readable storage medium of claim 12 wherein the reattach node is not part of a sub-structure formed below the target node.

17. The computer-readable storage medium of claim 11 wherein forming a queue comprises placing fewer than all of the nodes of the initial parse structure in the queue.

18. The computer-readable storage medium of claim 17 wherein placing fewer than all of the nodes of the initial parse structure in the queue comprises:

identifying a target node and a reattach node;

placing a top node of a sub-structure in the queue; and not placing other nodes in the sub-structure in the queue if the sub-structure does not include either the target node or the reattach node.

19. The computer-readable storage medium of claim 11 wherein forming an initial parse structure comprises executing rules from a parse rule grammar and wherein forming a reconstructed parse structure comprises executing rules from the parse rule grammar.

20. The computer-readable storage medium of claim 19 further comprising performing a process on the reconstructed parse structure in the same manner as the process would be performed on the initial parse structure.

21. A computer-readable storage medium having encoded thereon computer-executable instructions that when executed by a processor cause the processor to perform steps comprising:

generating an initial parse tree for a text segment;

identifying a target node and a reattach node in the initial parse tree, wherein the reattach node is not combined with the target node by a rule to form another node in the initial parse tree but is combined with an initial node in the initial parse tree;

identifying a reattachment rule for attaching the reattach node to the target node;

deconstructing the initial parse tree to form an ordered list of nodes and rules wherein the ordered list of nodes and rules includes at least one node that is not affected by attaching the reattach node to the target node instead of the initial node;

adding the reattachment rule to the ordered list of nodes and rules in a position that will cause the reattachment rule to attach the reattach node to the target node when executed; and executing the reattachment rule based on its position in the ordered list of nodes and rules to form a node in a reconstructed parse tree such that the reattach node is attached to the target node by the node formed by the reattachment rule and is not attached to the initial node wherein executing the reattachment rule comprises:

sequentially retrieving entries from the ordered list based on the order of the entries in the ordered list;

for each node retrieved from the ordered list, placing the node in a working stack; and for each rule retrieved from the ordered list, including the reattachment rule:

determining a number of nodes required by the rule;

removing the determined number of nodes from the top of the working stack;

executing the rule using the nodes removed from the working stack to form a resulting node for the reconstructed parse structure; and placing the resulting node at the top of the working stack.

22. The computer-readable storage medium of claim 21 wherein the reattach node is found in a structure beneath the target node in the initial parse tree.

23. The computer-readable storage medium of claim 21 wherein the reattach node is not found in any structure beneath the target node in the initial parse tree.

24. The computer-readable storage medium of claim 21 wherein forming a reconstructed parse tree further comprises executing at least one rule that was executed to generate the initial parse tree.

25. The computer-readable storage medium of claim 21 further comprising scoring the reconstructed parse tree in the same manner in which the initial parse tree would have been scored.

26. The computer-readable storage medium of claim 25 further comprising using a score for a reconstructed parse tree to perform sentence generation.

* * * * *

UNITED STATES PATENT AND TRADEMARK OFFICE
CERTIFICATE OF CORRECTION

| | | |
|---|---|---|
| PATENT NO. | : 7,634,398 B2 | Page 1 of 1 |
| APPLICATION NO. | : 10/150127 | |
| DATED | : December 15, 2009 | |
| INVENTOR(S) | : Sonja S. Knoll et al. | |

It is certified that error appears in the above-identified patent and that said Letters Patent is hereby corrected as shown below:

In column 1, line 60, after "moved" insert -- node. Because these rules and functions modify the --.

Signed and Sealed this
Eighth Day of February, 2011

David J. Kappos
*Director of the United States Patent and Trademark Office*